United States Patent [19]
Hicks

[11] 3,810,313
[45] May 14, 1974

[54] VEHICLE FRAME GAUGE

[75] Inventor: John R. Hicks, Milwaukee, Wis.

[73] Assignee: Applied Power Industries, Inc., Milwaukee, Wis.

[22] Filed: July 17, 1972

[21] Appl. No.: 272,351

[52] U.S. Cl. ............... 33/288, 33/181 AT, 33/193
[51] Int. Cl. ........................................... G01b 3/14
[58] Field of Search ............... 33/288, 264, 181 AT, 33/180 AT, 193, 158

[56] References Cited
UNITED STATES PATENTS

| | | | |
|---|---|---|---|
| 3,151,396 | 10/1964 | Junkins | 33/288 |
| 2,581,021 | 1/1952 | Jacobsen et al. | 33/288 |
| 3,111,773 | 11/1963 | Hunter | 33/193 X |
| 3,203,103 | 8/1965 | McElfresh et al. | 33/181 AT |
| 242,895 | 6/1881 | Derby | 33/158 |
| 149,761 | 4/1874 | Lathrop | 33/158 |

*Primary Examiner*—William D. Martin, Jr.
*Attorney, Agent, or Firm*—Roy E. Petherbridge; Robert L. Lindgren; Edward D. Gilhooly

[57] ABSTRACT

A vehicle frame gauge for indicating the degree of misalignment and distress of the alignment of a vehicle frame including a self-centering indicator which is mounted on a horizontal bar. The bar is hung beneath the vehicle frame by means of a pair of hanger rods which interengage with the frame at various selected locations thereof. The rods are coupled to the horizontal bar by an improved spring and collar mechanism which simplify the gauging procedure. In practice, a plurality of gauges are attached to the vehicle when checking alignment of a frame.

6 Claims, 4 Drawing Figures

PATENTED MAY 14 1974　3,810,313

VEHICLE FRAME GAUGE

BACKGROUND OF THE INVENTION

This invention relates in general to gauging systems and in particular to an improved vehicle frame gauge.

More specifically, the invention relates to a frame gauge which is self-centering when attached to a vehicle frame and which permits an operator to adjust the device prior to attachment to the frame. The frame gauge herein disclosed includes a pair of hanger rods which support a horizontal bar beneath the frame being gauged. The horizontal bar includes an indicia element which aids in determining the degree of misalignment of the frame being tested. Generally, a plurality of gauges are hung at various positions on the frame and collectively provide a readily determinable and accurate estimation of the degree of misalignment of the frame.

During the repair of damaged vehicles, it is desirable to insure that the frame of the vehicle is accurately aligned in comparison to its original dimensions and configuration. As a result of a collision it is possible that a vehicle absorbs a variety of damage such as misalignment of the frame in both horizontal and vertical directions whereby the frame lies at improper heights along its length or is non-symmetrical and the like.

Although it is possible that detection by visual inspection of the damage and misalignment of a vehicle after a collision is possible, the understructure and frame may have suffered considerable damage which can not be detected without the use of measuring instruments. In the prior art, several gauges have been employed for the purpose of aiding in the repair of damaged vehicle frames. However, the prior art techniques of gauging misalignment are inefficient in quickly and accurately determining the degree of distortion of the frame. Most of the known instruments require an elaborate procedure in attaching the gauge to the vehicle and to determine the amount of alignment. Often, the prior art devices require that an operator extensively adjust the gauges after they have been hung on the body which is tedious and time consuming. These gauges also do not permit rapid corrective adjustments of the gauge if necessary after being hung.

Many of the prior art devices utilize a complex and cumbersome structure which is both inefficient in checking the degree of misalignment and which is relatively expensive to manufacture. It has also been found that many of the gauges previously used have not achieved a high level of accuracy in indicating the degree of misalignment which is desirable for the safe and proper repair of the vehicle frames.

SUMMARY OF THE INVENTION

It is, therefore, an object of this invention to improve the gauging of vehicle frames.

Another object of this invention is to improve the gauging of the degree of misalignment and depression of a vehicle frame.

A further object of this invention is to improve the gauge utilized in determining the degree of misalignment and depression of a vehicle frame.

Still another object of this invention is to reduce the complexity and cost of a frame gauge.

A still further object of this invention is to decrease the steps required in accurately gauging the degree of misalignment and depression of a vehicle frame.

These and other objects are attained in accordance with the invention wherein there is provided an improved gauging device for determining the degree of misalignment and depression of a vehicle frame. In use of the invention a plurality of substantially identical gauges are mounted beneath the frame of the vehicle whereby visually an operator can determine the degree and cause of misalignment. Each of the gages includes a hanger rod having a round configuration which provides an unlimited range in which the rod can be rotated relative to the frame for proper hanging of the gauge to the frame. The two hanger rods support a horizontal bar which is releasably coupled to the two hanger rods by means of a spring engagement member which permits rapid and efficient attachment of the bar to the rods. Adjustable abutment means slidably attached to each of the rods allows the gauge to be preset as to the proper vertical height of the horizontal bar prior to being hung on the car whereby the horizontal bar may be readily attached to the rods after they have been installed in position on the vehicle.

BRIEF DESCRIPTION OF THE DRAWINGS

Further objects of this invention, together with additional features contributing thereto and advantages accruing therefrom, will be apparent from the following description of an embodiment of the invention when read in conjunction with the accompanying drawings, wherein.

DESCRIPTION OF THE PREFERRED EMBODIMENT

Figure 1:
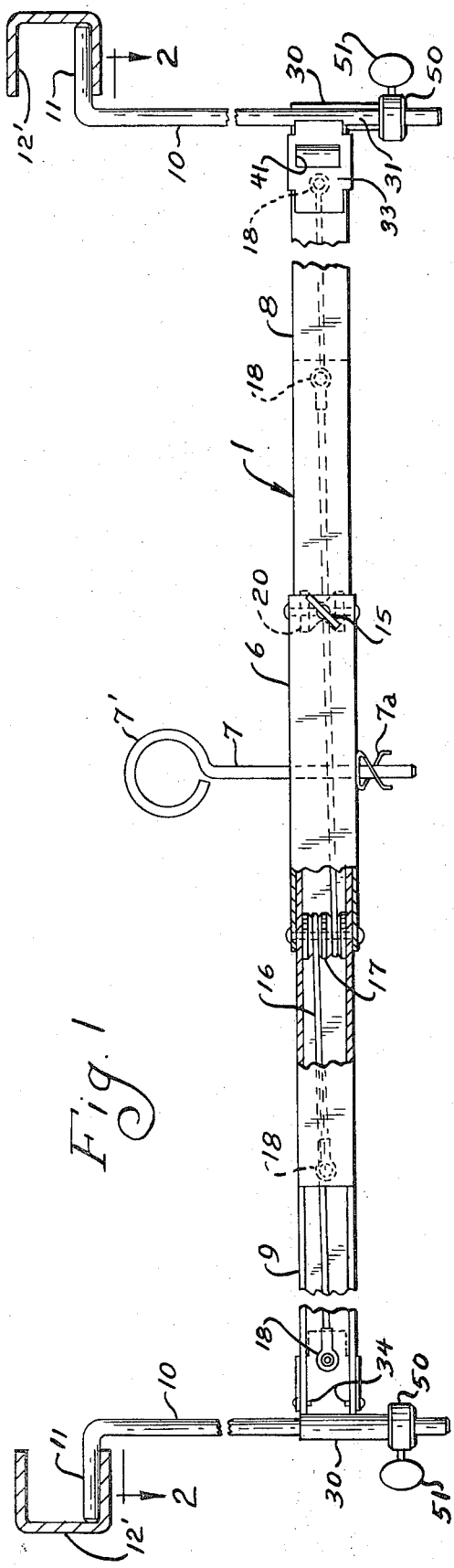
FIG. 1 is a side schematic illustration of a frame gauge of the invention in hanging relationship on a vehicle frame.
Figure 2:
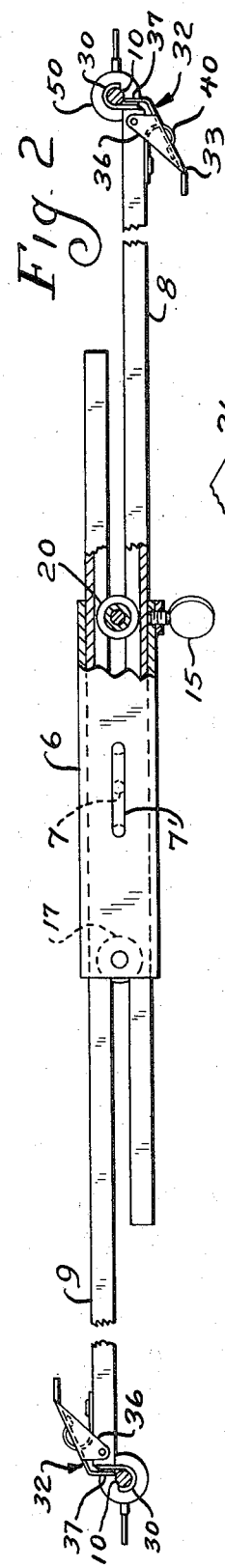
FIG. 2 is a top schematic illustration taken along line 2 — 2 of FIG. 1.

Referring now to FIGS. 1 and 2 there is illustrated a preferred embodiment of the vehicle frame gauge of the invention. Frame gauge 1 includes a tubular housing 6 which supports in vertical direction an upright centering rod 7 which includes an upper circular-like or bull's-eye gauging portion 7'. The centering rod 7 extends through housing 6 and is vertically adjustable relative thereto by means of a nut element 7a. Although the centering rod 7 is shown projecting in an upward direction in FIG. 1, it is possible to also project the element downward if desired.

A pair of elongated parallel bars 8 and 9 are simultaneously and longitudinally movable in opposite directions in housing 6 whenever either of the respective bars is forcibly displaced toward or away from centering rod 7. Bars 8 and 9 are adapted to be supported on a vehicle by means of a pair of hanger elements 10 removably attached to the outer respective ends of bars 8 and 9. Each of hanger elements 10 is in the form of an elongated rod having an upper end 11 off-set for suspension from one of the opposite channel shaped side beams 12' of a vehicle as illustrated in FIG. 1 or to any other suitable portion of the chassis of the vehicle. Bars 8 and 9 are rectilinear channels freely slidable within the interior of housing 6 when released, but are adapted to each be firmly held in adjusted position relative to each other and housing 6 by means of a thumb-screw 15. In order to effect simultaneous movement of the bars in opposite directions when a pulling or pushing force is applied to either bar to adjust the gauge according to width of a particular frame, the outer end portions of both bars are connected by cables or cords 16 with a grooved roller 17 rotatably mounted within one end of housing 6.

Cords 16 are wrapped around the grooves of roller 17 whereby the opposite ends of the cables are attached to both bars 8 and 9 by attachment elements 18 as shown in FIG. 1 whereby the cords are maintained in a taunt condition. An idler roller 20 is rotatably mounted in housing 6 and acts along with grooved roller 17 to guide bars 8 and 9 while being adjusted longitudinally. From the foregoing it should be apparent that the frame gauge of the invention is self-centering in the sense that centering rod 7 is maintained at the exact midpoint between the ends of the gauge in all adjusted positions of bars 8 and 9.

Figure 4:
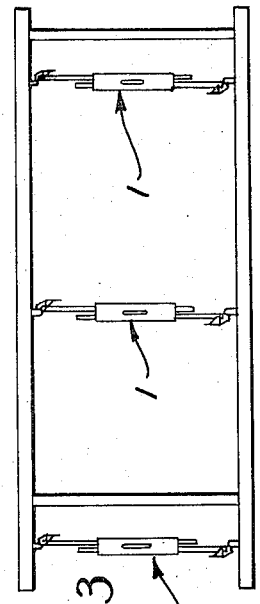
FIG. 4 is a partial perspective illustration of the attachment means for affixing the horizontal bar to a hanger rod.

A U-shaped bite or clasp element 30 having an open section 31 to receive laterally a portion of a hanger rod is suitably affixed to the respective outer ends of bars 7 and 8. Clasp element 30 is adapted to embrace hanger element 10 and as seen in FIGS. 2 and 4 the inner portion of element 30 substantially conforms to the circular cross-section of hanger 10. The use of a hanger rod having a circular cross-section permits adjustable movement of the rod with respect to the clasp element 30 whereby upper end 11 may be directed in infinite directions allowing the hanger to be effectively attached to a desired portion of the frame of a vehicle. Clasp 30 is adapted to be attached to the hanger in direction transverse to the longitudinal axis of hanger 10 and thus endwise insertion of the clasp onto the hanger rod is not required thereby facilitating mounting of the bars on the hanger rods while suspended.

A spring and clip arrangement 32 is attached to each of bars 8 and 9 adjacent clasp 30 and is utilized to releasably retain each of the bars on respective hangers 10. Spring and clip arrangement 32 includes a clip element 33 which is pivotally mounted at the top and bottom of the bars by means of spot rivot 34 as best shown in FIGS. 2 and 4. Clip 33 includes a body portion 35 and arms 36 through which rivot 34 passes. An angled projection 37 extends from one side of the body and is adapted to engage hanger 10 at one end through open section 31 of clasp element 30.

A conventional leaf-type spring 40 is attached to one side of the bar and extends in a curved configuration into contact with clip 33. To aid in maintaining the spring in position and to improve resilience, opening 41 is provided on body portion 35 whereby a portion of the body of the spring projects outwardly through the opening. It should be apparent from the foregoing that spring 40 acts to bias the projection 37 of clip 33 against hanger 10 to prevent relative movement between clasp element 30 and hanger 11. To release, remove or insert the clasp on the hanger, the operator merely presses by one handed action portion 43 of clip 33 in a manner to pivot the clip and projection 37 away from open portion 31 of the clasp 10 permitting the bar to be removed or inserted on the hanger or the bar adjusted in a vertical direction along the hanger.

An adjustable sliding collar 50 is mounted on hanger 10 beneath clasp 30 to act as a support the bar assembly by contacting the bottom edge of clasp 30. In addition, collar 50 is used to aid in the mounting of the gauge into operative position as will be explained later. Collar 50 includes a central hole through which the hanger rod passes whereby a thumb-screw 51 passes through the side of the collar to releasably engage hanger 10.

Figure 3:
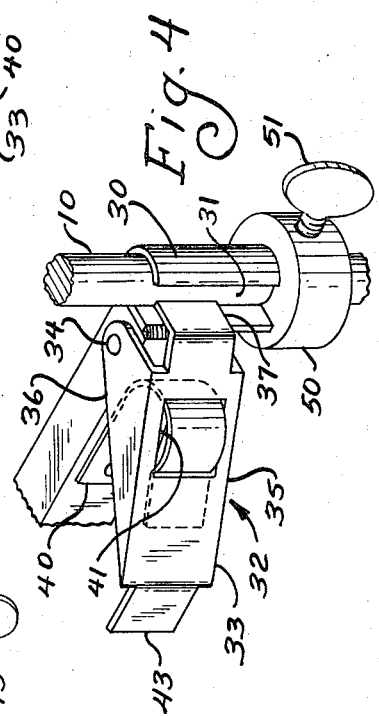
FIG. 3 is a top schematic illustration of a frame showing a plurality of frame gauges of FIG. 1 in operative position thereon.

As shown in FIG. 3, it is generally advantageous to utilize a plurality of identical frame gauges such as three or more to gauge the degree of depression or misalignment of the vehicle frame. To achieve such gauging it is desirable that the bar and housing 6 of each of the identical frame gauges project downward from the vehicle frame to an imaginary horizontal datum plane whereby if no misalignment of the frame exists, the housing and centering rod of each of the instruments would be substantially aligned. Proper alignment can easily be detected in such a situation since the upper portions 7' of centering rod 7 of each of the gauges would collectively appear as concentric bull's-eyes or circles when viewed from one end and each housing would appear on the same plane.

A determination of a suitable vertical position of the bars on the hangers can be achieved by resorting to a manual commonly available in the auto repair field which includes detailed dimensions of the frame and bodies and the vertical dimensions beneath a frame at selected longitudinal locations to establish an imaginary datum plane for each of the known manufactured vehicles. By hanging the frame gauge of the invention at the point conforming to the standarized measurements of the manual, each of the horizontal portion of the gauges located at the selective locations would lie on the so-called imaginary datum plane if the vehicle is properly aligned. However, if misalignment exists in the frame, the circle portions 7' of the center sight rod would not appear concentric and misalignment can be easily detected. Misalignment can also be detected by viewing whether the housing or bars of the gauges appear to be on the same horizontal plane as viewed from the end of vehicle.

In operation, after the manual has been consulted and the number of gauges and locations thereof determined according to the model of vehicle, each of the gauges are ready to be adjusted according to the available information. Prior to the hanging of the gauges to the vehicle and attachment of clasp 30 thereto, collar 50 is adjusted along hanger 10 to a position thereon where the imaginary datum should exist for the particular model of vehicle and location of the gauge. Thereafter, each pair of hangers 10 for a single gauge are hung on the vehicle frame at the particular location selected and the bars 7 and 8 are inserted and attached to hangers 10 as described previously.

Since collar 50 has been pre-set at the approximate exact location where the datum plane should exist, it is apparent that the bars are attached to the hangers 10 at the proper vertical position by placing clasp 30 in abutting relationship with the collar. Thus, the proper horizontal position of the bars relative to hangers 10 is automatically determined after the hangers have been installed. If any minor adjustments are required after the actual hanging of the hangers and bars on the frame as evidences by visual inspection, the provision of clip element 33 and collar 50 allows rapid and easy adjustment of the bars relative to the hangers to compensate for any improper positioning of the hanger due to erroneous data or measuring and the like. Although the gauge is described to be used in conjunction with a dimension manual, it is also within the scope of the invention to determine a horizontal datum through visual judgment. Further, it is possible to attach the bars to the hangers of the invention prior to the installation thereof on a frame, if desired.

While the invention has been described with reference to a preferred embodiment, it will be understood by those skilled in the art that various changes may be made and equivalents may be substituted for the elements thereof without departing from the true spirit and scope of the invention. In addition, many modifications may be made to adapt a particular situation or material to the teachings of the invention without departing from the essential teaching.

I claim:

1. A vehicle frame gauge comprising
a pair of hanger elements adapted to be attached in hanging relationship on opposite sides of a vehicle frame being gauged,
a pair of bar means coupled together for adjustable movement in opposite directions,
attachment means attached to each of the bar means for releasably coupling each of the bar means to a respective hanger element,
said attachment means permitting coupling intergagement of the bar means to the hanger elements in a direction transverse to the longitudinal axis of the hanger elements,
a slidable abutment element vertically adjustable on each of the hanger elements independent of the adjustment means to establish a predetermined position of the bar means on the hanger elements and to aid in the support of bar means thereon, and
said abutment element including retaining means to retain the abutment element against movement relative to the hanger elements at said predetermined position and adapted to contact the attachment means at said position.

2. The vehicle frame gauge of claim 1 wherein the abutment means includes a collar slidably mounted on each of the hanger elements.

3. A vehicle frame gauge comprising
a pair of hanger elements adapted to be attached in hanging relationship on opposite sides of a vehicle frame being gauged,
a pair of bar means coupled together for adjustable movement in opposite directions,
attachment means attached to each of the bar means for releasably coupling each of the bar means to a respective hanger element,
said attachment means permitting coupling intergagement of the bar means to the hanger elements in a direction transverse to the longitudinal axis of the hanger elements,
the attachment means includes a clasp having an open portion through which the hanger passes to be coupled or uncoupled to the bar.

4. The vehicle frame gauge of claim 3 wherein the attachment means further includes a clip element pivotally mounted on each of the bar means and a spring means for resiliently biasing the clip element into contact with the hanger element through the open portion for coupling the bar means thereto.

5. The vehicle frame gauge of claim 3 wherein the hanger element possess a circular cross-sectional area.

6. The vehicle frame gauge of claim 5 wherein the clip element is pivotally mounted along a substantially vertical axis.

* * * * *